July 22, 1969  R. A. STUBBS ET AL  3,457,393
ANALOGUE DECOMPRESSION COMPUTING DEVICE
Filed Oct. 7, 1965  4 Sheets-Sheet 1

INVENTORS
ROYSTON A. STUBBS
DEREK J. KIDD
BY Smart & Biggar
ATTORNEYS.

July 22, 1969 R. A. STUBBS ET AL 3,457,393
ANALOGUE DECOMPRESSION COMPUTING DEVICE
Filed Oct. 7, 1965 4 Sheets-Sheet 3
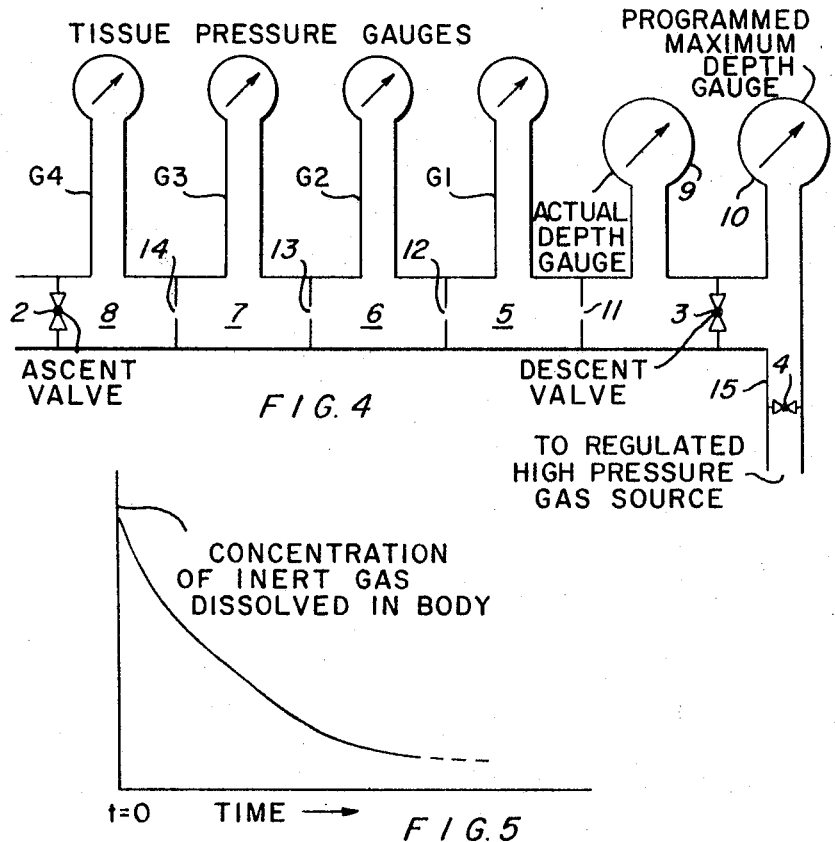
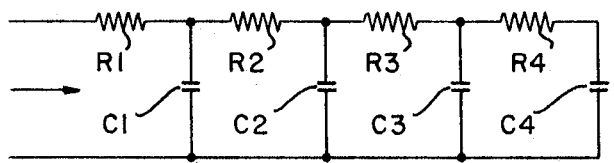
FIG. 6
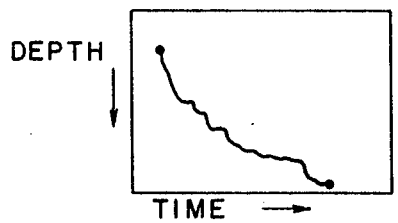
FIG. 8
INVENTORS
ROYSTON A. STUBBS
DEREK J. KIDD
BY *Smart & Biggar*
ATTORNEYS 3,457,393
ANALOGUE DECOMPRESSION COMPUTING
DEVICE
Royston A. Stubbs, King City, Ontario, and Derek J. Kidd,
Thorn Hill, Ontario, Canada, assignors to Her Majesty
the Queen in right of Canada as represented by the
Minister of National Defence
Filed Oct. 7, 1965, Ser. No. 493,684
Claims priority, application Canada, Nov. 10, 1964,
916,148
Int. Cl. G06g 7/60
U.S. Cl. 235—184                                    10 Claims

ABSTRACT OF THE DISCLOSURE

Devices for simulating the effects of the inert gas component of air at changing pressures upon human tissues. A first signal, either pressure or voltage, is derived which is proportional to the partial pressure of the inert gas component of a variable pressure air supply. A plurality of similar second signals are derived which vary substantially exponentially with time with variations of said first signal, which second signals are proportional to the partial pressure of inert gas in various body tissues. The values of the second signals are divided by ratios characteristic of the various body tissues. The first signal may be decreased as rapidly as possible as long as it never becomes less than any of said second signals divided by its associated ratio. Minimum safe decompression times may thus be determined for various pressures and for various exposure times to said various pressures. One arrangement provides a pointer and an indicator which a diver can monitor to regulate his rate of ascent from a dive.

---

This invention relates to analogue devices for approximating for a person breathing a mixture of oxygen and inert gas from a variable pressure supply, the minimum time in which said pressure can be reduced from a given pressure to a lower pressure without the person experiencing decompression sickness. These devices according to the invention simulate the partial pressure of inert gas in various tissue compartments in man when breathing oxygen diluted with an inert gas at various pressures.

It is necessary for divers and caisson workers to breathe air under pressures greater than atmospheric. During the time spent at pressure, the amount of inert gas in solution in the body will increase. During return to atmospheric pressure, this increased amount of inert gas must be eliminated from the body. This is known as decompression. The disregard for properly controlled decompression produces cavitation within the body which results in some form of decompression sickness, ranging in severity from mild skin irritation, to death. An aviator proceeding to high altitude has a similar problem. The aviator's problem can be alleviated by pre-oxygenation prior to flight, during which the inert gas in solution is eliminated. At the present time, a series of decompression tables are available for determining decompression time schedules. Thus a diver, after working at a certain depth will, by following a decompression time schedule, rise to a certain depth and remain there for a specified time, before rising and again waiting to allow his body to adjust to the reduced pressure. It is to be understood that in the disclosure and claims, the term "air" includes any suitable mixture of $O_2$ and inert gas, e.g., $O_2$ and helium, the term "inert gas" including $N_2$ and other non-reactive gases.

The basic assumptions upon which modern decompression tables have been based are:

(i) Tissues will reach equilibrium with a change in ambient inert gas pressure in accordance with gas diffusion laws.

(ii) The net result of successive pressure changes on tissue inert gas pressures is an algebraic sum of the individual changes.

However, the circulation to a tissue could vary with other changes; temperature for example, and may thus affect the local pressure gradient. A gross change in pressure differential certainly disrupts the gas diffusion/perfusion mechanism.

There is evidence that rapidly repeated reversals of pressure gradient also modify this simple algebraic summation concept.

(iii) Blood inert gas is in equilibrium with alveolar inert gas.

However, the alveolar/blood gas differentials vary in different parts of the lung. Similarly the ratio between alveolar ventilation and pulmonary blood flow is not as constant throughout the lungs. Asterio-venous shunts occur, the effect of which is not constant and may be aggravated by large changes in pressure differential across the alveolar membrane, for example. Since these regional differences do not all act in the same direction, however, and in default of more precise data, it is a reasonable assumption to make that pulmonary venous blood inert gas is in equilibrium with alveolar inert gas.

(iv) A threshold of super-saturation exists during decompression beyond which symptoms of decompression sickness will be manifest. It is not yet determined with certainty as to how these threshold values of super-saturation might change from tissue to tissue or vary in accordance with tissue saturation.

Decompression tables provide information which can be applied *only* under certain limiting circumstances in diving and caisson work and *still* contain unknown safety factors and sources of error which result in greater amounts of time being spent under compression than necessary. This results in the loss of useful time or decreased safety in operational diving and caisson work.

Departure from any rigid decompression schedule may not be appreciated by either the diver or the surface controller, and hence adjustment will not be made, or if detected, the complex mathematical calculations necessary to best adjust the schedule is not feasible. Either no adjustment will be made at all, or a rule of thumb adjustment will be made, which will generally be costly in time and may even be detrimental.

According to the invention there is provided means for simulating the manner in which the concentration of inert gases dissolved in the body varies in response to breathing a mixture of oxygen and inert gas under varying pressures.

The invention enables computation of the decompression schedule to determine, within the limits imposed by inevitable error and any arbitrary margin of safety, the minimum time for safe decompression.

The invention provides analogue devices which simulate the manner in which the concentration of inert gases vary in the body of a person breathing air under varying pressures. According to one aspect of the invention, the devices may be designed and operated to simulate the conditions encountered in, for example, a dive, and have application in the laboratory, hospital or field in the teaching, planning and control of decompression schedules. According to another aspect of the invention, the devices may be carried by a diver or caisson worker and will provide unequivocal command information at all times on the decompression time schedule the diver or worker must follow to avoid decompression sickness.

The invention is further described with reference to the accompanying drawings in which:

FIGURE 4 is a schematic representation of a modification of the embodiment shown in FIGURE 1;

FIGURE 5 is a graph showing how the concentration of inert gas dissolved in the body of a person breathing air under pressure is reduced when the pressure of the air supply is reduced.

FIGURE 6 is a schematic diagram showing a modified electrical analogue;

FIGURE 8 is a graph of depth plotted against time for a hypothetical dive.

It can readily be seen from the curve in FIGURE 5 that it takes a finite time after the air pressure is reduced for the concentration of inert gas in a person's body to reach equilibrium at the lower pressure. If the ambient pressure is lowered too quickly there is danger of bubbles forming in the human body, much as bubbles form in a bottle of soda pop when the cap is snapped off. These bubbles, as mentioned above can cause decompression sickness. Thus it is essential that a diver not ascend too rapidly lest he develop decompression sickness. On the other hand, it is desirable that he be able to ascend as quickly as possible short of developing decompression symptoms, so that there is minimum loss of useful time in operational diving. The curve shown in FIGURE 5 is representative of a family of curves whose ordinate at time $t=0$, would vary depending on the initial pressure.

Figure 1:
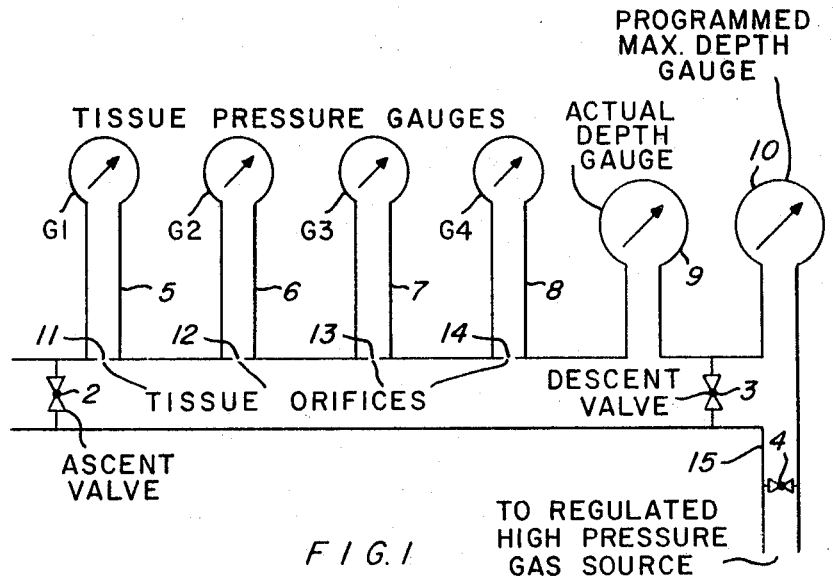
FIGURE 1 is a schematic representation of an embodiment of the invention using a pneumatic analogue.

FIGURE 1 shows a pneumatic analogue computing device which can simulate the changes in concentration of an inert gas dissolved in a diver's body during a dive. This computer comprises a manifold 1 having an ascent valve 2 and a descent valve 3. The manifold 1 is connected to a regulated high pressure gas source (not shown) through a valve 4. The pressure in manifold 1 constitutes a signal proportional to the inert gas component of the diver's supply pressure. Four chambers 5, 6, 7, and 8 are connected to the manifold 1 through orifices 11 to 14. The chambers 5 to 8 are provided with pressure gauges G1, G2, G3 and G4 respectively. The manifold 1 is connected to a gauge 9, labeled "actual depth gauge" in FIGURE 1. A programmed maximum depth gauge 10 is connected between descent valve 3 and valve 4.

The chambers 5 to 8 represent body tissue compartments. Each volume-orifice combination is adjusted to have a time constant analogous to the gas diffusion time constant of a different body tissue compartment, and enough different combinations are used so as to ensure that the time constants represent the behaviour of the human body as a whole. The time constants are proportional to the volumes of chambers 5 to 8 and to the size of orifices 11 to 14. The orifices 11 to 14 may comprise one or more virus filters, rather than single openings. Virus filters are used for virus filtration and are formed of synthetic material, e.g. plastic, and contain a large number of extremely small holes. The volume-orifice combinations may be "tuned" to given time constants by, for example, "stacking" different numbers of these virus filters. Alternatively, the volumes of chambers 5 to 8 may be varied to adjust the volume-orifice combinations to different time constants.

While this and all of the other embodiments of the invention described herein show means to simulate 4 different tissues, more than four tissues may be represented. It has been found that representing four tissues in the computing devices gives satisfactory results while representing less than 4 tissues has not given reliable information as to the minimum time for ascent from a dive. In some cases it might be desirable to represent more than 4 tissues, e.g. in very extended dives, since some tissues might have extremely slow time constants, i.e. such tissues saturate and unsaturate very slowly.

The particular selection of volume-orifice combinations depends upon the nature of the compression operation and upon external conditions, such selection being determined in any given instance by available data and experimental results.

The device of FIGURE 1 may be used to simulate a dive as follows:

(i) A regulator (not shown) on the high pressure gas source is adjusted until the programmed maximum depth gauge 10 reads 80% of ambient pressure, approximately 12 p.s.i.g., which is equivalent to the inert gas partial pressure in tissue in a person breathing air at atmospheric pressure. With the ascent valve 2 closed, the descent valve 3 is opened until the pressures in the chambers 5 to 8 reach this initial pressure.

(ii) The descent valve 3 is then closed and the pressure corresponding to the partial pressure of the inert gas at maximum programmed depth is applied to the programmed depth gauge 10 by adjusting the high pressure regulator. This procedure prevents overshooting the pressure corresponding to the desired maximum depth during descent. The descent valve 3 is then opened by an amount which is manually adjusted to control the simulated rate of the descent as monitored by the actual depth gauge 9.

(iii) During the descent, regardless of pattern, each of the chambers 5 to 8, will be pressurized at a rate determined by their respective volume and orifice combination.

(iv) On reaching maximum programmed depth, the pressure corresponding to actual depth is maintained for the time scheduled for the dive.

(v) At the end of the scheduled time, the descent valve 3 is closed and the ascent valve 2 opened by an amount manually adjusted to simulate the pressure decrease corresponding to ascent at a certain rate. This rate is determined by the following consideration: The simulated ascent may be made as rapidly as possible provided that the pressure ratio for each simulated tissue pressure, as read on any of the gauges G1 to G4, to the pressure as read on the gauge 9 corresponding to any particular depth, does not exceed a given ratio for each tissue. This is derived from the fact that in real tissue, gas bubbles must be prevented from exceeding a certain critical dimension. When a gas bubble is allowed to expand beyond this critical dimension, it results in the phenomenon known as decompression sickness or "the bends." Therefore, the ascent valve 2 can be opened and pressure reduced continuously as long as the pressure reading given by the gauge 9 is never allowed to be less than any one of each of the tissue pressures when divided by its characteristic ratio. Typical values of these ratios range from 1.5 to 2.7.

(vi) The foregoing procedure of ascent is followed until the pressure reading of gauge 9 is that originally set in paragraph (i). This is the inert gas partial pressure component of the surface pressure.

With the apparatus of FIGURE 1, any diving or compression pattern may be programmed and the continuous minimum time of decompression pattern determined. The device can be designed to operate in, for example, 1⁄60 of real time so that any one dive having a duration in hours may be simulated in minutes with the computer.

Referring again to FIGURE 5, the shape of this curve is due to the fact that the concentration of dissolved inert gas varies more rapidly in some body tissues than in others in response to pressure changes. However, it is difficult to determine the exact rate at which this concentration varies in a particular tissue. Under laboratory conditions however, it is possible to determine fairly accurately the overall rate at which the dissolved gas leaves a person's systems when he breathes air under pressure and the pressure is then reduced. Thus, it is neither practicable nor necessary to specify which particular tissues are represented by the chambers 5 to 8. It is merely necessary that each orifice-volume combination have a different time constant so that the overall response of the apparatus is analogous to the behaviour of a human body under changing pressure conditions. Thus, volume-orifice combination 8–14 might have one time constant, volume-orifice combination 7–13 might have a lesser time constant, volume-orifice combination 6–12 less still and so on.

The time constant of a volume-orifice combination may be defined as the time required for the pressure in the chamber (volume) to reach half the value of an applied pressure change, assuming initially stabilized conditions, and may therefore be called a "half-time" constant. Thus, referring to FIGURE 1, if the pressure in manifold 1 is initially equal to the pressure in chamber 5, for example, and the manifold pressure is suddenly increased, it will take some time for the pressure in chamber 5 to increase to the same pressure as in the manifold, because of the dimensions of chamber 5 and the restrictive effects of orifice 11. The time constant of volume-orifice combination 5–11 is the time it takes for the pressure in chamber 5 to reach half the value of the increased manifold pressure.

As mentioned previously in connection with FIGURE 1 a simulated ascent may be made as rapidly as possible provided that the ratio of the pressure for each simulated tissue pressure, as read on any of the gauges G1 to G4, to the pressure as read on the gauge 9 corresponding to any particular depth, does not exceed a given ratio for each tissue. The particular ratios used depend on the time-constants selected for the volume-orifice combinaions and on the particular inert gas under consideration, i.e. nitrogen, helium, etc. The volume-orifice combinations are constructed with a range of arbitrary time constants, e.g. 10, 20, 40 and 80 minutes. Each volume-orifice combination is then assigned a tentative ratio and the computing device operated to simulate various dives and subsequent ascents. The results of these simulated dives and ascents, i.e. minimum ascent times to avoid decompression sickness, are compared with known safe ascent times which have been determined from tables published by various investigators of the factors involved in decompression symptoms, e.g. A. E. Boycott, G. C. C. Damant and J. S. Haldane, Prevention of Compressed Air Illness, J. Hygiene 8: 342–443, 1908. The ratios assigned to the volume-orifice combinations are adjusted until the results given by the computing device are comparable to those determined from tables published in the literature.

As described in detail later, the analogue device shown in FIGURE 1 can be modified so as to be carried by a diver during a dive and provide information to the diver enabling him to ascend in approximately the minimum time without developing decompression symptoms. This modified device enables further refinements to be made to the ratios. If a diver, ascending on the basis of the information provided by the analogue device, develops decompression symptoms, this indicates that further "juggling" of the ratios is needed. The ratios can be adjusted until the analogue device gives reliable information to the diver so that he can ascend without developing decompression symptoms, or at least an acceptable level of decompression symptoms. These refined ratios can be transferred to the other embodiments of analogue devices disclosed herein.

With the afore-mentioned time constants of 10, 20, 40 and 80 minutes, the ratios should be 2.65, 2.15, 1.85 and 1.65, respectively.

Using the apparatus shown in FIGURE 1, it is possible to simulate a dive. The apparatus may be modified so as to be carried by a diver so that the diver can ascend from depth by following a pointer to obtain the minimum time to reach the surface safely without reference to other depth gauges or time.

In this modified computer the valves 2, 3 and 4 and the "programmed maximum depth gauge" 10, are omitted. The left end of manifold 1 as viewed in FIGURE 1 is sealed. The manifold 1 is then connected to the diver's air supply via conduit 15.

The diver's air supply is regulated, either manually or automatically, so as to match the pressure of the water at the diver's depth. As the diver descends, the pressure of his air supply increases and part of this air is fed to manifold 1 via conduit 15. The chambers 5 to 8 then pressurize at various rates determined by their respective volume-orifice combinations, as discussed previously. The diver can read his actual depth from depth gauge 9. As the diver ascends, the pressure of his air supply is reduced, thus reducing the pressure in manifold 1 and the reading on his depth gauge 9. The chambers 5 to 8 then begin depressurizing at rates determined by their particular volume-orifice combination. The diver can ascend as rapidly as possible provided that the ratio of pressure for each simulated tissue to the pressure at depth does not exceed a given ratio for each tissue, as in the case for the simulated dive.

The arrangement shown in FIGURE 1 is somewhat awkward to use since five pressure gauges require monitoring continuously with time, four of which have to be divided by constant ratios. The modified arrangement shown in FIGURE 7 requires only the following of a pointer for a diver to obtain the minimum time to reach the surface safely without reference to other depth gauges or time.

Figure 7:
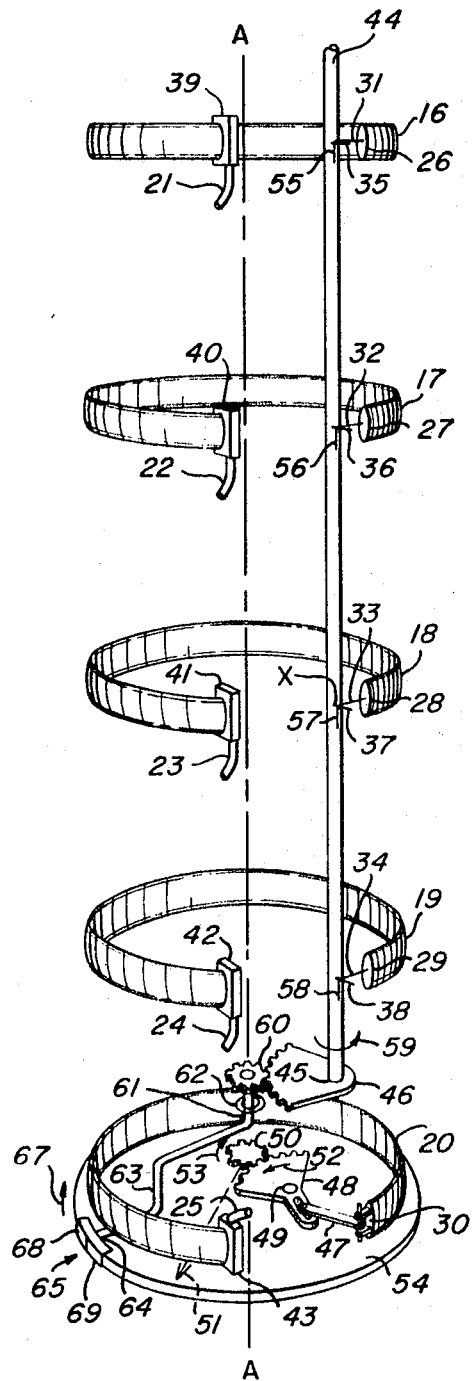
FIGURE 7 is a perspective view of a modification of the pneumatic analogue shown in FIGURE 1.

Referring to FIGURE 7, this modified arrangement, which uses the diver's air supply, is seen to comprise five Bourdon tubes 16 to 20 arranged coaxially along an axis A—A. The Bourdon tubes 16 to 19 correspond to the tissue pressure gauges G1 to G4 in FIGURE 1. The Bourdon tubes 16 to 19 are connected to the chambers 5 to 8 (FIGURE 1) via conduits 21 to 24. The Bourdon tube 20 is connected to the manifold 1 (FIGURE 1) via a conduit 25. The ends 39 to 43 of Bourdon tubes 16 to 20 are secured against movement by means not shown, while the ends 26 to 30 are free to move. Thus, if pressure is applied to Bourdon tube 20, for example, the tube will tend to straighten out and end 30 will move generally to the right as viewed in FIGURE 7. This movement is transmitted by a linkage mechanism 47 to a gear segment 48 to cause the latter to rotate in the direction of arrow 52 about pivot 49. Gear segment 48 meshes with pinion 50 which is mounted for rotation about axis A—A. Pinion 50, to which pointer 51 is affixed, then rotates in the direction of arrow 53. The pointer 51 indicates the actual depth on a graduated scale (not shown) on dial face 54.

A shaft 44 is mounted in suitable bearings (not shown) for rotation about an axis parallel to axis A—A. Four stiff wires or rods 35 to 38 project radially from shaft 44 as shown in FIGURE 7. The free ends 26 to 29 of Bourdon tubes 16 to 19 are provided with projecting wires or rods 31 to 34 having downwardly turned ends 55 to 58. The rods 31 to 34 pass over rods 35 to 38 and if, for example, Bourdon tube 16 tends to straighten in response to an increase in pressure in the chamber to which it is connected, the end 55 of rod 31 will engage with rod 35 and rotate shaft 44 in the direction of arrow 59. The lower end 45 of shaft 44 is provided with a gear segment 46 which meshes with pinion 60 keyed or otherwise affixed to the upper end of shaft 61. Pinion 60 and shaft 61 rotate about axis A—A, as does pinion 50. The lower end of shaft 61 is bent to form an arm 63 extending radially from axis A—A. The end 64 of arm 63 is provided with an indicator 65. It can readily be seen that rotation of shaft 44 in the direction of arrow 59 will cause indicator 65 to move in the direction of arrow 67, i.e. in the same direction that pointer 51 moves upon an increase in pressure in Bourdon tube 20. A coil spring 62 is provided on shaft 61 to bias indicator 65 towards the "zero" position.

The rod 33 crosses over rod 37 at a distanct "X" along rod 37 as shown in FIGURE 7. This distance is proportional to the ratio by which the pressure measured by Bourdon tube 18 must be divided. The rods 31, 32 and 34 cross over rods 35, 36 and 38 at distances which are proportional to the ratios by which the pressures measured by Bourdon tubes 16, 17 and 19 must be divided. The indicator 65 is thus driven by that Bourdon tube whose pressure, divided by its ratio, has the greatest value. The rods 31 to 34 are preferably bent to substantially the same curvature as Bourdon tubes 16 to 19 to ensure that the ratios do not vary as the ends of the Bourdon tubes move in response to increasing pressure. The range of movement of the free ends of the Bourdon tubes is however, not very great, e.g. ¼ inch, so that changes in the ratios is not a serious problem.

The assembly shown in FIGURE 7 together with the manifold and tissue volume-orifice combinations are housed in a suitable container (not shown) having the dial face exposed to view and a connection leading to the diver's air supply.

As the diver descends, pointer 51, in response to increasing pressure of the diver's air supply, is deflected in the direction of arrow 53. At the same time the chambers begin to pressurize. The Bourdon tube whose pressure, divided by its ratio, has the greatest value, will control the rotation of shaft 44 in the direction of arrow 59 and hence, the movement of indicator 65 in the direction of arrow 67. Thus pointer 51 and indicator 65 move in the same direction although indicator 65 moves at a slower rate since it takes some time for the chambers to pressurize. Initially, of course, rotation of shaft 44 is controlled by that chamber having the shortest time constant but if the diver remains for some time at depth, control passes successively to the chambers having longer time constants but smaller ratios. Upon reaching a certain depth the indicator 65 will lag the pointer 51 by some amount because the Bourdon tube controlling the rotation of shaft 44 has its pressure "reading" divided by a certain ratio. Because of the latter factor, indicator 65 will lag pointer 51 no matter how long the diver remains at a given depth. When the diver decides to ascend again, he can rise until the pointer 51 is centered on indicator 65. The left and right halves of indicator 65 may be of different colours. Thus portion 68 may be green and portion 69 red and the diver would, upon ascending, attempt to rise at such a rate that pointer 51 does not enter the red region 69 of indicator 65. As the diver ascends of course, the chamber pressures decrease and hence indicator 65 moves towards "zero," i.e. in the opposite direction to that of arrow 67. Pointer 51 also moves toward "zero" during ascent in response to decreasing pressure of the diver's air supply. To avoid decompression sickness, the diver ascends so that indicator 65 and pointer 51 tend towards zero together although, initially, the diver can rise quickly until pointer 51 is centered on indicator 65.

The pressure remaining in the chambers constitutes a memory, which conditions the solution of any subsequent exposure to pressure.

Suitable means (not shown) can be included for providing an electrical or pneumatic signal proportional to the difference of the readings of pointer 51 and indicator 65. This signal can be used during an ascent to automatically control the divers buoyancy and hence his rate of ascent so as to bring the diver to the surface in the minimum time possible without the diver experiencing decompression sickness. Similarly, such a signal can be used to control automatically a decompression required by occupants of the compression chamber or lock.

Figure 2:
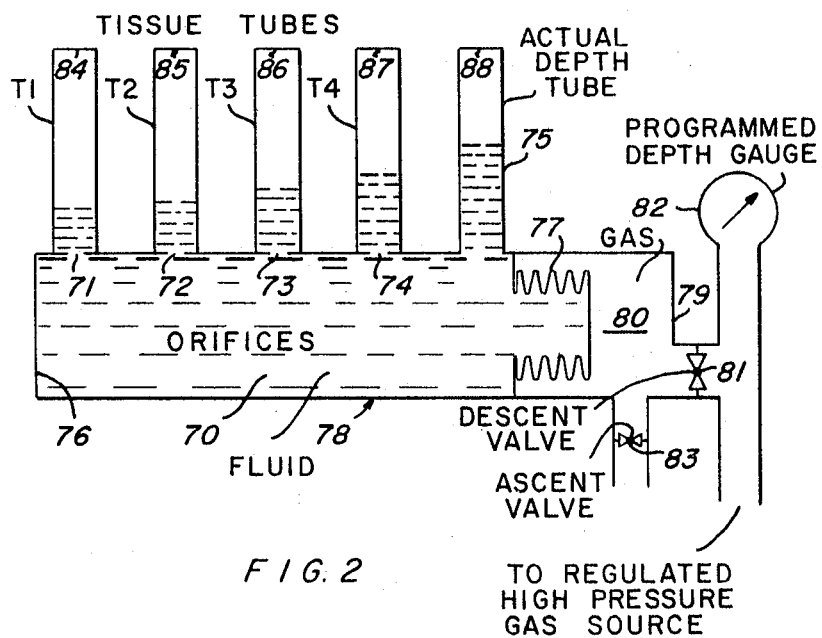
FIGURE 2 is a schematic representation of a second embodiment of the invention using a hydraulic analogue

Referring now to FIGURE 2, there is shown a liquid analogue device which can be used to simulate a dive. This device is similar to the pneumatic type in that controlled rates of tissue pressure are achieved by means of volumes and fixed orifices for each tissue.

The device of FIGURE 2 comprises a fluid reservoir 70 comprising part of a container 78. The left end of container 78 is sealed by an end plate 76. A bellows 77 separates the fluid reservoir 70 from a gas chamber 80 in the container 78. The chamber 80 communicates with a regulated high pressure gas source through a descent valve 81. A programmed depth gauge 82 is connected to the high-pressure gas source. The gas chamber 80 communicates with the atmosphere via an ascent valve 83.

Four tissue pressure tubes T1 to T4 communicate with the fluid reservoir via orifices 71 to 74. An actual depth tube 75 communicates directly with the reservoir 70. The tissue pressure tubes T1 to T4 and the actual depth tube 75 are transparent. These tubes are of equal size and are sealed as at 85 to 88.

Each tube is arranged to have an initial fluid level such that the amount of trapped gas above each liquid level and the sealed end is different. If the volume of trapped gas in the actual depth tube is taken as unity and the volume of trapped gas in each of the tissue tubes is greater than unity by a given ratio, then the level of fluid in each of the tubes T1 to T4 will indicate its respective pressure divided by its respective characteristic ratio.

This apparatus is adjusted for a given time scale by means of the various orifices and is programmed in the same manner as the pneumatic analogues shown in FIGURE 1. In this case, however, the ascent becomes a simple matter of comparing each tissue pressure tube liquid level with respect to the actual depth tube liquid level. The ascent may be made continuously as long as the liquid level in the actual depth tube is never allowed to fall below the liquid level in any of the tissue pressure tubes. Then the tissue pressures divided by their respective ratios are never greater than the inert gas component of the actual pressure at depth.

Figure 3:
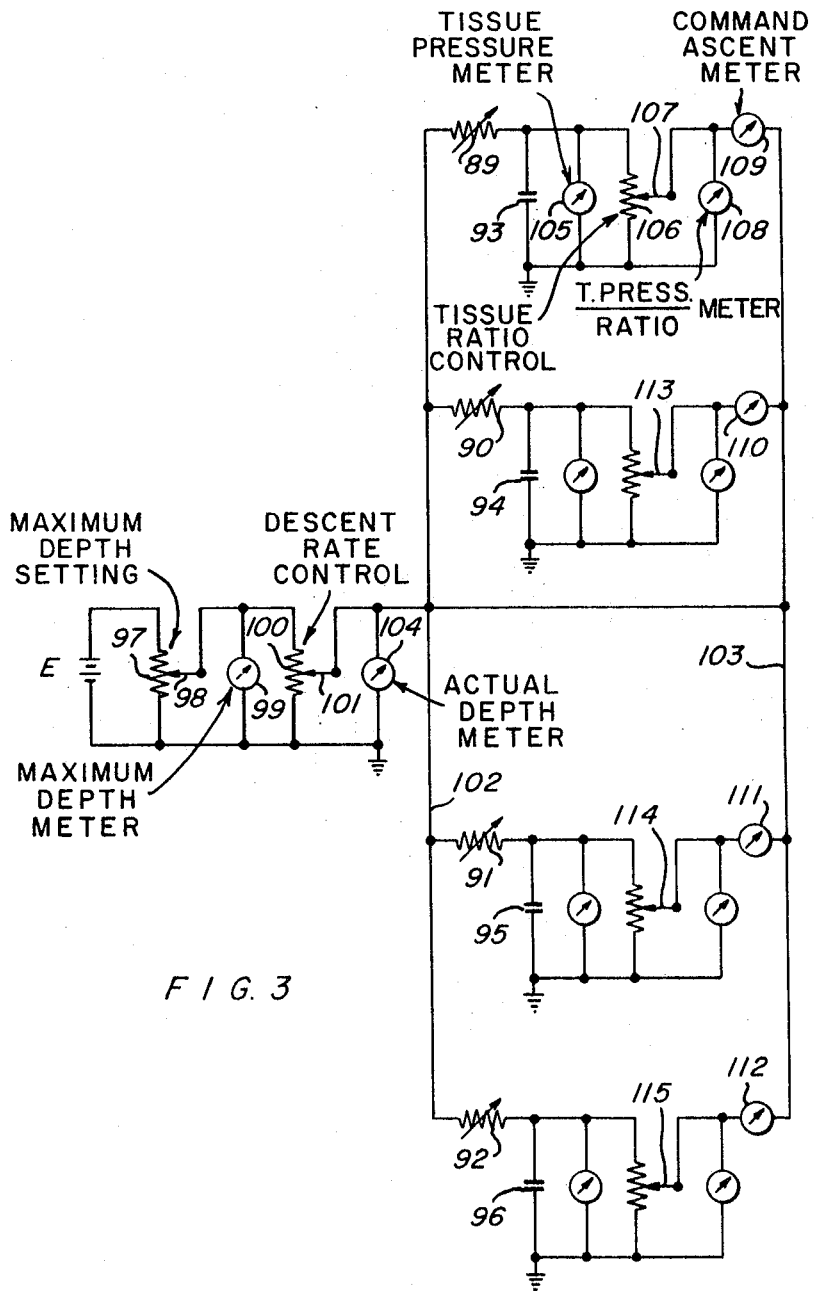
FIGURE 3 is a schematic diagram of a third embodiment of the invention using an electrical analogue.

FIGURE 3 shows an electrical analogue apparatus for simulating a dive. In this device, pressure is represented by voltage, orifices by resistors and volumes by capacitors.

The computer is energized by a voltage source E having its negative terminal grounded. A potentiometer 97 is connected between ground and the positive terminal of the voltage source E. The voltage representing maximum depth and hence maximum pressure is set by means of a tap 98 on potentiometer 97. The voltage corresponding to the maximum depth setting is read by means of a voltmeter 99 connected between ground and the tap 98.

A potentiometer 100 is connected between ground and the tap 98 on potentiometer 97. A simulated descent is controlled by means of a tap 101 on potentiometer 100, the tap 101 being connected to two lines 102 and 103. The setting of tap 101 which represents depth pressure is read by means of a voltmeter 104 connected between ground and tap 101. Between line 102 and ground there are four resistor-capacitor combinations 89–93, 90–94, 91–95, and 92–96. The resistors 89 to 92 are analogous to the orifices 11 to 14 in FIGURE 1 and the capacitors 93 to 96 are analogous to the volumes 5 to 8 in FIGURE 1.

In No. 1 tissue, the tissue pressure is represented by the voltage across capacitor 93 and this voltage is read by means of a voltmeter 105. The tissue ratio control comprises a potentiometer 106 connected across capacitor 93 and having a tap 107. The voltage on the tap 107 is read by means of voltmeter 108. This reading represents the tissue pressure divided by the tissue ratio. The tap 107 is also connected to one terminal of a command ascent voltmeter 109, the other terminal of which is connected to line 103. The command ascent meter 109 measures the difference in voltage between taps 101 and 107, i.e. the difference between the voltage representing the actual depth pressure and the voltage representing the tissue pressure divided by its ratio.

The circuits representing No. 2 to No. 4 tissues are similar to the circuit representing Number 1 tissue for different time constants of the resistor capacitor combinations.

To programme the apparatus, the maximum depth of the simulated dive is set by means of tap 98 on potentiometer 97 while tap 101 is at its minimum setting so that no voltage is applied to the capacitors 93 to 96. The setting of tap 101 is then increased to simulate a dive, thus applying potential to capacitors 93 to 96 which then commence charging at various rates determined by the time constants of the resistor-capacitor combinations 89–93 to 92–

96. The tap 101 can be varied up and down to simulate a diver going to a certain depth, returning to a lesser depth and then going deeper again. Any dive pattern may be simulated. The rate of ascent is controlled by the command ascent meters 109 to 112. The command ascent meters 109 to 112 may be voltmeters which read both positive and negative voltages and the setting of tap 101 may be decreased as rapidly as possible provided that none of the meters 109 to 112 reads negatively. The voltage corresponding to the tissue pressure divided by its ratio which has the greatest value controls the maximum rate of ascent. Assuming that this is tissue No. 1 then the setting of tap 101 may be decreased at a rate which keeps the reading of command ascent meter 109 at or near 0.

The time constants of the resistor-capacitor combinations 89–93 to 92–96 may be made small so that the apparatus operates in a fraction of real time. A simulated dive to any given depth may be programmed into the apparatus and the latter will then calculate the minimum time to reach the surface. FIGURE 8 shows a graph of a hypothetical dive. If this graph is drawn to scale, the curve may be traced by a curve tracer linked to the descent rate control to programe the dive into the apparatus. As the curve tracer moves along the graph the descent rate control varies proportionally. After the dive is programmed into the apparatus, the tap 101 is then brought to zero under control of the command ascent meters, as before.

In an alternative form of the electrical analogue device, each of the command ascent meters is replaced by a voltage comparator which compares the voltages on taps 107 and 113 to 115 with the voltage on tap 101. The voltages on taps 107 and 113 to 115 are the voltages corresponding to the tissue pressures divided by their ratios while the voltage on tap 101 corresponds to the actual pressure at the diver's depth. The comparator compares the voltages representing the tissue pressures divided by their ratios with the voltage representing the actual depth pressure. The difference between the voltage corresponding to the actual depth pressure and the voltage corresponding to that tissue pressure divided by its ratio which has the greatest value comprises an error signal which operates a servo control to automatically reduce tap 101 of the descent rate control at a rate to keep the aforesaid difference at or near zero. A curve tracer linked to the descent rate control then gives the required ascent pattern from which the minimum time for ascent is readily found. The minimum time for ascent can, of course, be determined by merely observing the time it takes for the descent rate control to be reduced to zero.

An advantage of this device is that it can determine the minimum time for ascent in a small fraction of real time. Thus the minimum time required for a diver to ascend from a dive of extended duration e.g. several days, may be determined in a matter of minutes.

The pneumatic analogue shown in FIGURE 1 is a "parallel" type of analogue. That is, the volume-orifice combination 5–11 to 8–14 are in parallel with a manifold 1. FIGURE 4 shows a "series" type of pneumatic analogue device. In this embodiment the volume-orifice combination 5–11 to 8–14, are connected in series. This embodiment is programmed and operated in the same manner as the embodiment of FIGURE 1. This embodiment may also be used in an actual dive by replacing ascent valve 2 with an end plate to seal off the left end of volume 8, omitting descent valve 3, valve 4 and gauge 10 and connecting conduit 15 to the diver's air supply.

The electrical analogue device shown in FIGURE 3 is also a parallel type of analogue apparatus. FIGURE 6 shows how the resistor-capacitor combinations may also be placed in series. Thus resistor-capacitor combination R1–C1 represents tissue No. 1, resistor-capacitor combination R2–C2 represents tissue No. 2, and so on. Again the basic manner of operation is the same as previously discussed.

It will of course be understood that each of the volume-orifice combinations has a substantially exponential response in units of time to a change in applied pressure and each of the resistor-capacitor combinations has a substantially exponential response in units of time to a change in applied voltage.

What we claim as our invention is:

1. A device for simulating the effects of the inner gas component of air at changing pressures upon human tissues comprising a variable pressure air supply, a first signal means responsive to the pressure of said air supply for deriving a first signal proportional to the pressure of the inert gas component of said air supply; a plurality of second means responsive to said first signal for deriving a plurality of second signals each substantially exponentially responsive in units of time to changes in said first signal and having a respective magnitude representative of the partial pressure of inert gas dissolved in a body tissue; and means for controlling the rate of change of the pressure of said air supply so that the ratios of the magnitudes of said second signals to the magnitude of said first signal are maintained at values at least as low as given predetermined values for each of said second signals.

2. A device as claimed in claim 1 wherein said first signal and said plurality of second signals are pneumatic pressure signals.

3. A device as claimed in claim 2 wherein said means for deriving said first signal comprises a manifold connected to said variable pressure air supply and said means for deriving said plurality of second signals comprises, for each said second signal, a volume-orifice combination communicating with said manifold.

4. A device as claimed in claim 1 wherein said means for deriving said first signal comprises a container having a first and second end; said first end being sealed and said second end communicating with said variable pressure air supply and a bellows intermediate said first and second ends dividing said container into a fluid reservoir at the first end and a gas chamber at the second end, the fluid reservoir containing a fluid and having a transparent tube communicating therewith, the upper end of said tube being sealed and the gas chamber communicating with said air supply whereby variations in the pressure of said air supply are transmitted to said fluid and cause corresponding variations in the level of fluid in said tube.

5. A device as claimed in claim 4 wherein said means for deriving each of said plurality of second signals comprises a volume-orifice combination communicating with said fluid reservoir.

6. A device as claimed in claim 5 wherein each said volume comprises a length of transparent tubing having a first sealed end and a second end communicating via an orifice with said fluid reservoir whereby variations in the pressure of said air supply cause the levels of fluid in said lengths of tubing to vary, said second signals varying substantially exponentially with time upon changes in the pressure of said air supply.

7. A device as claimed in claim 2 wherein said pneumatic pressure signals are sensed by Bourdon tubes.

8. A device as claimed in claim 2 wherein said first pneumatic pressure signal actuates a first Bourdon tube adapted to pivot a pointer about an axis and each of said plurality of second pneumatic pressure signals actuates an associated one of a plurality of second Bourdon tubes, each of said plurality of second Bourdon tubes having a fixed end and a free end adapted to deflect an amount substantially proportional to its associated second pneumatic pressure signal, the free end of each of said plurality of second Bourdon tubes having a rod attached thereto, said rods being bent over further rods attached to a shaft adapted to rotate about an axis parallel to said first mentioned axis at distances from said rod proportional to said ratios whereby the rotational position of said shaft is controlled by whichever of said second Bourdon tubes has the highest value of pressure divided by its associated ratio, said shaft being adapted to pivot an indicator about said axis whereby the pressure of said air supply may be safely reduced with little or no danger of harmful decompression symptoms as long as said pointer is pivoted at least as much as said indicator.

9. A device for simulating the effects of the inert gas component of air at changing pressures upon human tissues comprising a variable voltage DC supply for supplying a voltage proportional to the pressure of the inert gas compenent of a variable pressure air supply, a plurality of series resistor-capacitor combinations connected across said variable voltage supply whereby said capacitors charge to voltages proportional to the pressures of inert gas in various tissues and at rates proportional to the rates at which said various tissues pressurize, each of said capacitor having a potentiometer connected across it whereby a tap on each potentiometer may be set to a voltage which is a predetermined ratio of the voltage across its associated capacitor, and means to permit comparison of the voltage of said variable voltage supply with the voltages at the taps of said potentiometers whereby a simulated safe maximum rate of decrease of pressure may be made by decreasing the voltage of said variable voltage supply as rapidly as possible as long as it never becomes less than the voltage on any of said potentiometer taps.

10. A device as claimed in claim 9 wherein said variable voltage supply comprises a first potentiometer connected across a source of substantially constant voltage, said first potentiometer having a tap adjustable to a voltage setting proportional to a predetermined maximum pressure and a second potentiometer connected across said first potentiometer and having a tap adapted to be moved at any desired rate whereby the voltage at the tape of said second potentiometer varies at a rate proportional to any desired rate of simulated pressure change, the maximum setting of the tap of said second potentiometer providing a voltage equal to the voltage set on the tap of said first potentiometer.

References Cited

UNITED STATES PATENTS

| | | | |
|---|---|---|---|
| 3,094,876 | 6/1963 | Hastings | 73—407 |
| 3,247,716 | 4/1966 | Ranke | 73—412 |
| 3,269,187 | 8/1966 | Perino | 73—407 |

FOREIGN PATENTS 726,233   10/1942   Germany.

MALCOLM A. MORRISON, Primary Examiner

FELIX D. GRUBER, Assistant Examiner

U.S. Cl. X.R.

73—412; 128—2.1; 235—180, 194